United States Patent
Lacondemine et al.

(10) Patent No.: US 8,976,342 B2
(45) Date of Patent: Mar. 10, 2015

(54) METHOD FOR ESTIMATING THE TRANSVERSE COMPONENT OF THE VELOCITY OF THE AIR IN A DOPPLER LIDAR MEASUREMENT

(71) Applicant: Thales, Neuilly-sur-Seine (FR)

(72) Inventors: Xavier Lacondemine, Valence (FR); Gregory Baral-Baron, Seyssins (FR); Jean-Pierre Schlotterbeck, Rochefort Samson (FR); Philippe Rondeau, Allex (FR)

(73) Assignee: Thales, Neuilly sur Seine (FR)

( * ) Notice: Subject to any disclaimer, the term of this patent is extended or adjusted under 35 U.S.C. 154(b) by 136 days.

(21) Appl. No.: 14/052,588

(22) Filed: Oct. 11, 2013

(65) Prior Publication Data

US 2014/0247441 A1 Sep. 4, 2014

(30) Foreign Application Priority Data

Oct. 12, 2012 (FR) ..................................... 12 02729

(51) Int. Cl.
*G01P 3/36* (2006.01)
*G01S 17/95* (2006.01)
*G01P 5/26* (2006.01)
*G01S 17/58* (2006.01)
*G01S 17/88* (2006.01)
*G01S 7/484* (2006.01)
*G01S 7/486* (2006.01)
*G01S 7/487* (2006.01)

(52) U.S. Cl.
CPC . *G01S 17/95* (2013.01); *G01P 5/26* (2013.01); *G01S 17/58* (2013.01); *G01S 17/88* (2013.01); *G01S 7/484* (2013.01); *G01S 7/4861* (2013.01); *G01S 7/487* (2013.01)
USPC ........................................... 356/28; 356/28.5

(58) Field of Classification Search
USPC ............. 356/3.01–3.15, 4.01–4.1, 5.01–5.05, 356/6–22, 28, 28.5
See application file for complete search history.

(56) References Cited

U.S. PATENT DOCUMENTS

| 5,164,784 A | 11/1992 | Waggoner |
| 5,351,045 A * | 9/1994 | Cornman ...................... 340/968 |
| 6,879,708 B2 * | 4/2005 | Wernet et al. ................. 382/107 |
| 2011/0043786 A1 | 2/2011 | Lacondemine et al. |
| 2011/0181863 A1 | 7/2011 | Renard et al. |

FOREIGN PATENT DOCUMENTS

| EP | 2270518 A1 | 1/2011 |
| EP | 2282216 A1 | 2/2011 |

* cited by examiner

*Primary Examiner* — Luke Ratcliffe
*Assistant Examiner* — Assres H Woldemaryam
(74) *Attorney, Agent, or Firm* — Baker Hostetler LLP

(57) ABSTRACT

A method for estimating the transverse component $V_{trans}$ of the velocity of the air comprises the following steps: emitting a focused laser beam; acquiring an electrical signal resulting from the transit of a particle across the beam at a point of transit; analyzing the signal so as to obtain a spectrogram revealing an elongate mark representative of the transit; estimating the duration of traversal of the laser beam by the particle and the slope of the mark; deducing from the duration and from the slope the distance between the point of traversal of the beam and the focusing point; determining the radius of the beam at the point of transit; deducing the transverse component from the radius and from the duration.

11 Claims, 3 Drawing Sheets

METHOD FOR ESTIMATING THE TRANSVERSE COMPONENT OF THE VELOCITY OF THE AIR IN A DOPPLER LIDAR MEASUREMENT

CROSS-REFERENCE TO RELATED APPLICATION

This application claims priority to foreign French patent application No. FR 1202729, filed on Oct. 12, 2012, the disclosure of which is incorporated by reference in its entirety.

FIELD OF THE INVENTION

The invention relates to a method for estimating the transverse component of the velocity of the air and applies notably to the field of laser anemometry.

BACKGROUND

Onboard equipment making it possible to estimate the speed of the air with respect to the carrier of the said device exists in the prior art. The carrier is for example an aircraft.

In particular, Doppler LiDARs can be used to measure the speed and the direction of the wind by backscattering of a laser beam on particles of aerosol type carried by the wind. The frequency shift between the emitted wave and the backscattered wave makes it possible to obtain the longitudinal velocity information. The longitudinal velocity is the wind velocity component along the laser sighting axis. Combining measurements arising from at least three non-coplanar sighting axes then makes it possible to access the three components of the velocity vector.

In the field of aeronautics, a Doppler LiDAR customarily generates a laser beam using a laser source, the said beam being focused a certain distance from the aircraft. Particles present in the atmosphere, that is to say aerosols, backscatter the incident beam. The Doppler frequency corresponding to the deviation between the frequency of the backscattered beam and that of the incident beam is detected by an interferometer so as to characterize the speed of the aircraft with respect to the wind.

The frequency shift corresponding to the Doppler frequency is directly proportional to the longitudinal component of the relative speed of the carrier with respect to the air, the longitudinal component being the component along the laser sighting axis.

It is known that the Doppler frequency $f_{Doppler}$ has the value:

$$f_{Doppler} = \frac{2 \times V_{long}}{\lambda}$$

in which expression:
$V_{long}$ represents the projection on the laser sighting axis of the vector V corresponding to the speed of the aircraft with respect to the air;
$\lambda$ represents the wavelength of the emitted beam.

Doppler laser anemometry is increasingly being used in systems for estimating the speed of aircraft since it makes it possible to perform a direct measurement, remotely, without any protruding element and independently of the conventional means relying essentially on pressure measurements.

A particular operating regime called the monoparticle regime is of interest here. In this regime, the laser beam is strongly focused in such a way that each particle traversing it produces an individually detectable signal.

The signal generated during the traversal of the Gaussian laser beam by a particle is customarily designated by the word "burst". It can be viewed as the product of a signal of sinusoidal frequency equal to the Doppler frequency and of a Gaussian window. The width of this Gaussian window is dependent on the width of the laser beam at the point where the particle traverses it and on the transverse velocity of the particle at this same point.

Depending on the point at which the particle crosses the beam, the curvature of the wavefronts of the beam can moreover induce a variation in the frequency of the signal backscattered around the Doppler frequency. The frequency-modulated signal is then designated by the word "chirp".

The relative speed of the carrier with respect to the air can be represented by a vector V expressed in a three-dimensional reference frame. Conventional use of a laser beam makes it possible to obtain only the projection of this vector on the axis of the beam.

The modulus of the vector representative of the speed of the aircraft with respect to the air mass which carries it is called the "True Air Speed".

To estimate the true air speed, customarily designated by the acronym TAS, a combination of measurements arising from at least three non-coplanar beams is therefore required.

The simultaneous emission of a plurality of beams exhibits numerous drawbacks in practice. In particular, this involves the implementation of several telescopes for emission/reception of the beam whose integration on aircraft may turn out to be constraining and expensive.

Moreover, the distribution of the laser power according to several measurement axes is less effective in terms of detection sensitivity.

Finally, if the measurements are performed in a zone where the velocity of the particles is disturbed by the carrier, the determination of the modulus of the velocity on the basis of measurements performed at various points may turn out to be complex.

SUMMARY OF THE INVENTION

An aim of the invention is notably to alleviate the aforementioned drawbacks.

For this purpose the subject of the invention is a method for estimating the transverse component $V_{trans}$ of the velocity of the air. It comprises the following steps:
a. emitting a focused laser beam;
b. acquiring an electrical signal s(t) resulting from the transit of a particle across the beam at a point of transit;
c. analysing the signal s(t) so as to obtain a spectrogram revealing an elongate mark representative of the said transit;
d. estimating the duration D of traversal of the laser beam by the particle and the slope P of the mark;
e. deducing from the duration D and from the slope P the distance $z_0$ between the point of traversal of the beam and the focusing point;
f. determining the radius $\omega(z_0)$ of the beam at the point of transit;
g. deducing the transverse component $V_{trans}$ from the radius $\omega(z_0)$ and from the duration D.

The electrical signal s(t) is for example produced by an optical detector illuminated by the coherent mixing of a reference beam with the wave backscattered during the transit.

According to one aspect of the invention, a step determines the Doppler frequency $f_{Doppler}$ of s(t) corresponding to the deviation between the frequency of the backscattered beams and the incident beam, the longitudinal component of the velocity of the air being deduced from this deviation. The distance $z_0$ is determined using for example the following expression:

$$z_{0i} = \frac{P_i \cdot D_i^2 \cdot \lambda \cdot z_R^2}{8 \cdot \omega_0^2}$$

in which:

i is the index of the current particle for which the beam traversal is analysed;

$\omega_0$ is the radius at the emitted laser beam focusing point;

$\lambda$ is the wavelength of the emitted beam;

and Zr is the Rayleigh length associated with the beam and which can be calculated according to the expression:

$$z_R = \frac{\pi \cdot \omega_0^2}{\lambda}$$

The radius of the beam is determined for example using the expression:

$$z_{0i} = \frac{P_i \cdot D_i^2 \cdot \lambda \cdot z_R^2}{8 \cdot \omega_0^2}$$

in which:

$$z_R = \frac{\pi \cdot \omega_0^2}{\lambda}$$

The duration D is for example estimated by measuring the width of the mark appearing in the spectrogram.

The slope P of the mark is for example determined using the following expression:

$$P = \frac{\int (f_{inst}(t) - f_{Doppler})(t - t_0) p(t) dt}{\int (t - t_0)^2 p(t) dt}$$

in which:

$t_0$ represents the instant at which the amplitude of the signal is a maximum, the particle then passing closest to the axis of the beam. It can be determined with the aid of a barycentre calculation $$t_0 = \frac{\int\int t \cdot S(t, f) dt df}{\int\int S(t, f) dt df};$$

$$f_{inst} = \frac{\int f \cdot S(t, f) df}{\int S(t, f) df};$$

$$p(t) = \int S(t, f) df.$$

In one embodiment, the component $V_{trans}$ is determined using the following expression:

$$V_{trans_i} = \frac{2 \cdot \omega(z_{0i})}{D_i}$$

The modulus V of the velocity of the air can be determined by averaging the modulus of the velocity of the particles that have cut the beam in a predetermined range of distance from the focusing point such that:

|$z_0$|<Threshold_$z_0$

Threshold_$z_0$ being a predetermined threshold value.

According to another aspect of the invention, the time frequency analysis is carried out with the aid of an FFT fast transform.

The modulus V of the velocity of the air can be estimated by using the following expression:

$$V = \sqrt{V\text{long}^2 + V\text{trans}^2}$$

The subject of the invention is also an anemometer comprising a circuit for emitting a convergent laser beam and for receiving the reflections of the said beam in its environment and a processing unit, the said anemometer implementing the method described above.

The subject of the invention is also a computer program comprising instructions for the execution of the method described above, when the program is executed by a processor.

BRIEF DESCRIPTION OF THE DRAWINGS

Other characteristics and advantages of the invention will become apparent with the aid of the description which follows given by way of nonlimiting illustration, offered with regard to the appended drawings among which.

DETAILED DESCRIPTION

The method according to the invention affords access to the transverse component of the velocities of particle traversing a single beam of a LiDAR operating in the mono-particle regime. The method utilizes the time-frequency characteristics of the signal resulting from the transit of a particle in a laser beam so as to determine the diameter of the beam at the point where the particle has cut it. These time-frequency characteristics are for example the slope, the frequency variation and the duration of traversal. It is then possible to deduce the transverse component of the velocity from the estimated diameter and from the duration of traversal. Finally, by combining the transverse velocity and the longitudinal velocity, one deduces therefrom the modulus of the velocity of an individual particle traversing the beam of a LiDAR.

Figure 1:
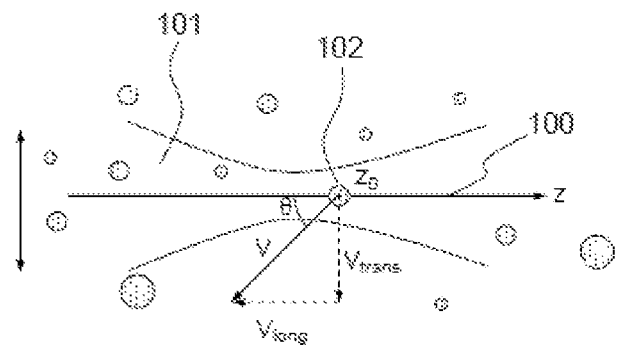
FIG. 1 gives an exemplary beam traversed by a particle on which the transverse and longitudinal components of the velocity appear.

FIG. 1 gives an exemplary beam traversed by a particle on which the transverse and longitudinal components of the velocity appear.

The beam portion represented is centred around the beam focusing point, that is to say around the location where the radius of the laser beam is a minimum. This location is customarily designated by the word "waist".

Figure 2:
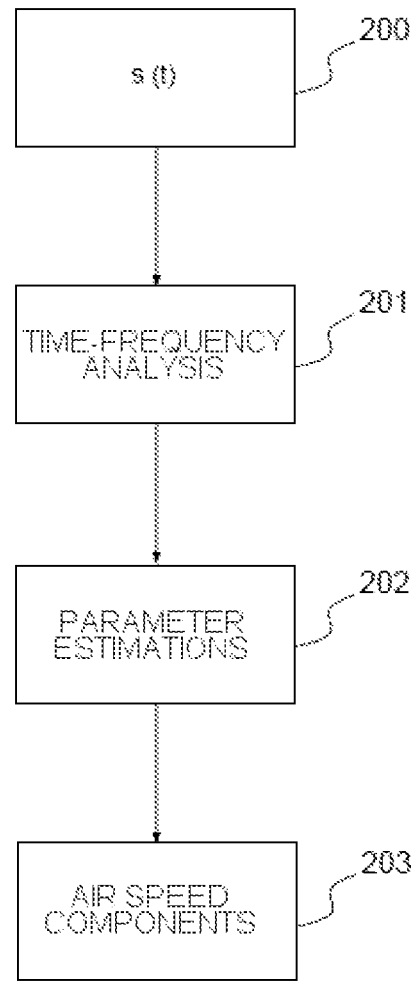
FIG. 2 presents a method making it possible to estimate the modulus of the vector V representative of the air speed.

The axis 100 is the axis of propagation of the laser beam. In this example, the LiDAR operates in mono-particle regime thereby implying that the laser beam emitted 101 is convergent. A particle of aerosol type 102 traversing the beam at a distance $z_0$ from its focusing point is represented. When the particle traverses the beam, a signal resulting from the backscattering of the laser beam can be used to determine the components of a vector V representative of the air speed. Two components of this vector are represented in FIG. 2. The first component is the longitudinal velocity component $V_{long}$ already explained and the second is the transverse velocity component $V_{trans}$. The transverse velocity component $V_{trans}$ corresponds to the orthogonal projection of the vector V in the plane orthogonal to the axis 100 of the laser beam.

FIG. 2 presents a method making it possible to estimate the modulus of the vector V representative of the air speed.

Accordingly, a step 200 is implemented so as to acquire an electrical signal s(t) resulting from the transit of a particle in the laser beam.

In the subsequent description, a Gaussian laser beam of radius $\omega_0$ at the focusing point and of wavelength $\lambda$ is considered. A particle of index i, travelling with a speed $V_i$ and cutting the beam at a distance $z_{0i}$ from the focusing point is also considered.

The amplitude of the electrical signal resulting from the transit of a particle in the laser beam at a given point called the point of transit is a linear chirp s(t) of Gaussian envelope whose simplified expression is given hereinbelow:

$$s(t) = A_0 \cdot \exp\left(-\frac{8 \cdot (t-t_0)^2}{D^2}\right) \cdot \cos\left(2\pi\left(f_{Doppler}(t-t_0) + P\frac{(t-t_0)^2}{2}\right) + \Phi_0\right)$$

In a second step 201, a time-frequency analysis of the signal s(t) is carried out. This analysis can be performed to obtain a spectrogram, that is to say a diagram associating a frequency spectrum of s(t) with various instants t. To determine it, a fast Fourier transform (FFT) can be used. During the traversal of the beam by the particle, the analysis of the signal s(t) reveals an elongate mark in the spectrogram.

The result of the time-frequency analysis of s(t) is then processed 202 so as to obtain a set of estimations which is representative of the traversal of the beam by the particle, in particular:
- the central frequency of s(t) which is equal to the Doppler frequency $f_{Doppler_i}$ of the chirp;
- the duration $D_i$ of traversal of the beam by the particle at the point of transit and which can be defined, by convention, as the duration for which the amplitude of the backscattered signal is greater than or equal to $1/e^2$ of the peak amplitude, where e represents Euler's number defined by $e=\exp(1)\sim 2.718$ or else as the base of the natural logarithm that is to say such that $\ln(e)=1$;
- the slope $P_i$ of the elongate mark representative of s(t) in the spectrogram or more rigorously the rate of variation of the frequency over time.

These parameters are then used to determine 202 the components of the air speed.

The Doppler frequency $f_{Doppler_i}$ is used to determine the longitudinal component of the air speed. Accordingly, the following expression can be used:

$$V_{long_i} = \frac{\lambda}{2} f_{Doppler_i}$$

The parameters $D_i$ and $P_i$ are used in the following step to determine the transverse component of the air speed. Initially, the distance $z_{0i}$ from the focusing point is deduced from the slope $P_i$ and from the duration $D_i$ by using for example the following expression:

$$z_{0i} = \frac{P_i \cdot D_i^2 \cdot \lambda \cdot z_R^2}{8 \cdot \omega_0^2}$$

in which:

$$z_R = \frac{\pi \cdot \omega_0^2}{\lambda}$$

Subsequently, the radius of the beam at the place where the particle traverses the beam is calculated on the basis of the distance from the focusing point $z_{0i}$. Accordingly, the following expression can be used:

$$\omega(z_{0i}) = \omega_0 \sqrt{1 + \left(\frac{z_{0i}}{z_R}\right)^2}$$

It is then possible to determine the transverse component of the air speed, it being possible to use the following expression:

$$V_{trans_i} = \frac{2 \cdot \omega(z_{0i})}{D_i}$$

Finally, the modulus of the air speed (TAS) is determined 203 by averaging the modulus of the velocity of the particles that have cut the beam in a predetermined range of distance between the point of transit and the focusing point such that:

$|z_0|<\text{Threshold\_z}_0$

This average can be computed over a time horizon compatible with the passband, typically 50 ms for a passband of 10 Hz.

The threshold Threshold\_$z_0$ can be chosen such that $z_0=z_R$ is about 5 mm for $\omega_0=50$ μm.

Figure 3:
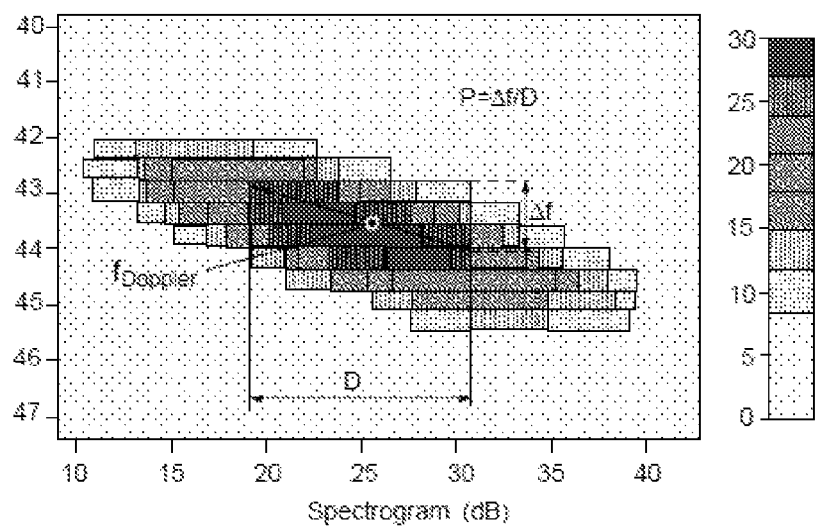
FIG. 3 represents an exemplary spectrogram on which the parameters $f_{Doppler}$, D and P appear.

FIG. 3 represents an exemplary spectrogram on which the parameters $f_{Doppler}$, D and P appear.

In this exemplary spectrogram, the evolution of the time is represented as abscissa and the frequencies as ordinate. The time is expressed in microseconds and the frequencies in megahertz.

The amplitude of the spectrogram is represented by a grey scale 301 so as to reveal various ranges of amplitudes expressed in decibels.

This exemplary spectrogram represents a measurement performed during the transit of a particle of aerosol type across the laser beam emitted. An elongate mark appears in dark grey and represents the chirp resulting from the transit of the particle through the beam.

The central frequency of this mark corresponds to the Doppler frequency $f_{Doppler}$ and if the value of the spectrogram at the time t and at the frequency f is denoted S(t, f), it may be determined on the basis of a barycentre calculation with the following expression:

$$f_{Doppler} = \frac{\iint f \cdot S(t,f) dt df}{\iint S(t,f) dt df}$$

The duration D of traversal of the beam by a particle is deduced from the following expression:

$$\sigma^2 = E[t^2] - E[t]^2 = \frac{\iint (t-t_0)^2 \cdot S(t,f) dt df}{\iint S(t,f) dt df}$$

In which:
σ represents the temporal standard deviation;
E[.] represents the expectation function.
One is customarily interested in the duration at $1/e^2$ of the maximum equal to D=4σ.

The slope P of the mark is deduced from the following expression:

$$P = \frac{\int (f_{inst}(t) - f_{Doppler})(t-t_0) p(t) dt}{\int (t-t_0)^2 p(t) dt}$$

in which:
$t_0$ represents the instant at which the amplitude of the signal is a maximum, the particle then passing closest to the axis of the beam. It can be determined with the aid of a barycentre calculation $$t_0 = \frac{\iint t \cdot S(t,f) dt df}{\iint S(t,f) dt df};$$

$$f_{inst} = \frac{\int f \cdot S(t,f) df}{\int S(t,f) df};$$

$p(t) = \int S(t,f) df.$

Figure 4:
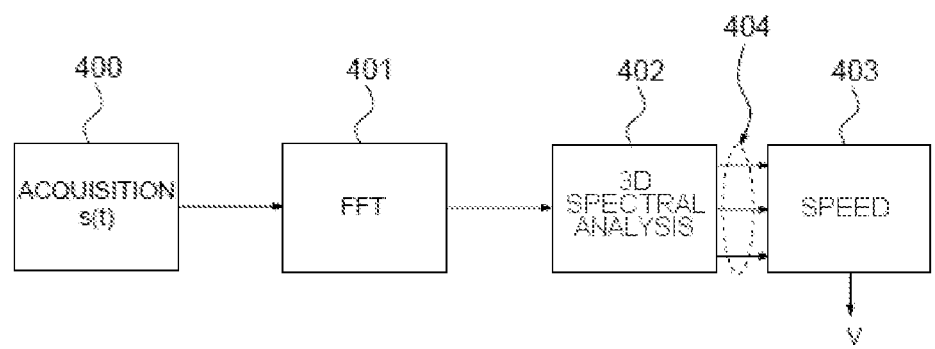
FIG. 4 gives an exemplary architecture that can be implemented in a laser anemometry device according to the invention.

FIG. 4 gives an exemplary architecture that can be implemented in a laser anemometry device according to the invention.

The function of a first module 400 is to acquire the signal s(t). Accordingly, means well known to the person skilled in the art can be used to receive the optical signal resulting from the reflection of the laser beam on the particle as well as means for converting the said optical signal into an electrical signal and digitizing it. The signal s(t) is shaped in such a way that its central frequency is substantially equal to the Doppler frequency.

Once the signal s(t) is available, a module 401 carrying out a Fast Fourier Transform (FFT) is used. This module shapes the results obtained after the transform so as to obtain a spectrogram such as that presented with the aid of FIG. 3.

A module 402 can then analyse the spectrogram so as to obtain an estimation 404 of the parameters $f_{Doppler}$, D and P, as described previously.

The parameters thus estimated 404 are thereafter processed by a module 403 for estimating the true speed V.

Figure 5:
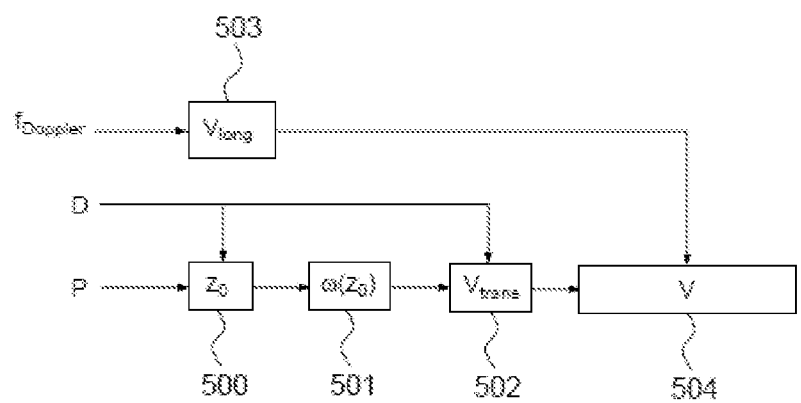
FIG. 5 illustrates in a simplified manner an embodiment of the module for estimating the true speed.

FIG. 5 illustrates in a simplified manner an embodiment of the module 403 for estimating the true speed.

The estimated parameters $f_{Doppler}$, D and P are used as input to this module.

D and P are used to successively estimate the distance between the spot where the particle traverses the beam and the focusing point $z_0$ 500, the radius of the beam at the level of the particle of aerosol type $\omega(z_0)$ 501 and the transverse component $V_{trans}$ 502, as described previously.

The frequency $f_{Doppler}$ is used in parallel to estimate 503 the longitudinal component $V_{long}$.

The modulus of the true speed can thereafter be estimated 504 by using Pythagoras' theorem:

$$V = \sqrt{V\text{long}^2 + V\text{trans}^2}$$

The invention claimed is:

1. A method for estimating a transverse component $V_{trans}$ of a velocity of air comprising the following steps:
    emitting a focused laser beam;
    acquiring an electrical signal s(t) resulting from a transit of a particle across the focused laser beam at a point of transit;
    analysing the electrical signal s(t) so as to obtain a spectrogram revealing an elongate mark representative of the said transit;
    estimating a duration D of traversal of the focused laser beam by the particle and a slope P of the elongate mark;
    deducing from the duration D and from the slope P the distance $z_0$ between a point of traversal of the focused laser beam and a focusing point;
    determining a radius $\omega(z_0)$ of the focused laser beam at a point of transit; and
    deducing the transverse component $V_{trans}$ of the velocity of air from the radius $\omega(z_0)$ and from the duration D.

2. The method according to claim 1, wherein a step determines a Doppler frequency $f_{Doppler}$ of the electrical signal s(t) corresponding to a deviation between the frequency of backscattered focused laser beams and an incident laser beam, a longitudinal component of the velocity of air being deduced from the deviation.

3. The method according to claim 1, wherein a distance $z_0$ is determined using the following expression:

$$z_{0i} = \frac{P_i \cdot D_i^2 \cdot \lambda \cdot z_R^2}{8 \cdot \omega_0^2}$$

in which:
    i is the index of the current particle for which a focused laser beam traversal is analysed;

$\omega_0$ is the radius at the emitted focused laser beam focusing point;

$\lambda$ is the wavelength of the emitted focused laser beam;

and ZR is the Rayleigh length associated with the emitted focused laser beam and which can be calculated according to the expression:

$$z_R = \frac{\pi \cdot \omega_0^2}{\lambda}.$$

4. The method according to claim 1, wherein the radius $\omega(z_0)$ of the focused laser beam is determined using the expression:

$$z_{0i} = \frac{P_i \cdot D_i^2 \cdot \lambda \cdot z_R^2}{8 \cdot \omega_0^2}$$

in which:

$$z_R = \frac{\pi \cdot \omega_0^2}{\lambda}$$

i is the index of the current particle for which a beam traversal is analysed; $\omega_o$ is the radius at the emitted laser beam focusing point; $Z_R$ is the Rayleigh length associated with the emitted beam.

5. The method according to claim 1, wherein the duration D is estimated by measuring a width of the elongate mark appearing in the spectrogram.

6. The method according to claim 1, wherein the slope P of the elongate mark is determined using the following expression:

$$P = \frac{\int (f_{inst}(t) - f_{Doppler})(t - t_0) p(t) dt}{\int (t - t_0)^2 p(t) dt}$$

in which $f_{Doppler}$ is the Doppler frequency:

f represents frequency and t represents time;

S represents a value or amplitude of the spectrogram;

$t_0$ represents the instant at which the amplitude of the signal is a maximum, the particle then passing closest to the axis of the beam, which can be determined with the aid of a barycentre calculation $$t_0 = \frac{\int\int t \cdot S(t,f) dt df}{\int\int S(t,f) dt df};$$

$$f_{inst} = \frac{\int f \cdot S(t,f) df}{\int S(t,f) df};$$

$$p(t) = \int S(t,f) df.$$

7. The method according to claim 1, wherein the transverse component $V_{trans}$ is determined using the following expression:

$$V_{trans_i} = \frac{2 \cdot \omega(z_{0i})}{D_i}.$$

in which:

i is the index of the current particle for which a focused laser beam traversal is analysed.

8. The method according to claim 1, wherein a modulus V of the velocity of air is determined by averaging the modulus V of a velocity of particles that have cut the focused laser beam in a predetermined range of distance from the focusing point such that:

$|z_0|<$Threshold_$z_0$, the Threshold_$z_0$ being a predetermined threshold value.

9. The method according to claim 1, in which a time frequency analysis is carried out with the aid of an FFT fast Fourier transform.

10. The method according to claim 1, wherein a modulus V of the velocity of air is estimated by using the following expression:

$V = \sqrt{V\text{long}^2 + V\text{trans}^2}$ in which: $V_{long}$ is the longitudinal velocity.

11. An anemometer comprising a circuit for emitting a focused laser beam and for receiving the reflections of said focused laser beam in an environment of said focused laser beam, and a processing unit, the said anemometer implementing the method according to claim 1.

* * * * *